(12) United States Patent
Makki Niri et al.

(10) Patent No.: US 11,875,128 B2
(45) Date of Patent: Jan. 16, 2024

(54) METHOD AND SYSTEM FOR GENERATING AN INTENT CLASSIFIER

(71) Applicant: Ada Support Inc., Toronto (CA)

(72) Inventors: Raheleh Makki Niri, Richmond Hill (CA); Gordon Gibson, Toronto (CA)

(73) Assignee: Ada Support Inc., Toronto (CA)

( * ) Notice: Subject to any disclaimer, the term of this patent is extended or adjusted under 35 U.S.C. 154(b) by 386 days.

(21) Appl. No.: 17/361,114

(22) Filed: Jun. 28, 2021

(65) Prior Publication Data

US 2022/0414344 A1 Dec. 29, 2022

(51) Int. Cl.
| | |
|---|---|
| *G06F 40/40* | (2020.01) |
| *G06N 20/10* | (2019.01) |
| *G06F 40/284* | (2020.01) |
| *G06N 3/084* | (2023.01) |

(52) U.S. Cl.
CPC .......... *G06F 40/40* (2020.01); *G06F 40/284* (2020.01); *G06N 3/084* (2013.01); *G06N 20/10* (2019.01)

(58) Field of Classification Search
CPC ....... G06F 40/40; G06F 40/284; G06N 20/10; G06N 3/084
See application file for complete search history.

(56) References Cited

U.S. PATENT DOCUMENTS

| | | | |
|---|---|---|---|
| 8,346,563 | B1 | 1/2013 | Hjelm et al. |
| 9,661,067 | B2 | 5/2017 | Seth et al. |
| 10,498,898 | B2 | 12/2019 | Mazza et al. |
| 10,733,497 | B1 | 8/2020 | Sesnowitz et al. |
| 10,740,566 | B2 | 8/2020 | Sapugay et al. |
| 10,839,161 | B2 | 11/2020 | Galitsky |

(Continued)

FOREIGN PATENT DOCUMENTS

CN 111626063 9/2020

OTHER PUBLICATIONS

Huggins, Matthew, et al. "Practical guidelines for intent recognition: Bert with minimal training data evaluated in real-world hri application." Proceedings of the 2021 ACM/IEEE International Conference on Human-Robot Interaction. 2021. (Year: 2021).*

(Continued)

*Primary Examiner* — Bhavesh M Mehta
*Assistant Examiner* — Edward Tracy, Jr.
(74) *Attorney, Agent, or Firm* — Smart & Biggar LP

(57) ABSTRACT

Methods and systems for training an intent classifier. For example, a question-intent tuple dataset comprising data samples is received. Each data sample has a question, an intent, and a task. A pre-trained language model is also received and fine-tuned by adjusting values of learnable parameters. Parameter adjustment is performed by generating a plurality of neural network models. Each neural network model is trained to predict at least one intent of the respective question having a same task value of the tasks of the question-intent tuple dataset. Each task represents a source of the question and the respective intent. The fine-tuned language model generates embeddings for training input data, the training input data comprising a plurality of data samples having questions and intents. Further, feature vectors for the data samples of the training input data are generated and used to train an intent classification model for predicting intents.

30 Claims, 8 Drawing Sheets

(56) References Cited

U.S. PATENT DOCUMENTS

| | | |
|---|---|---|
| 10,878,808 B1 | 12/2020 | Mathias et al. |
| 2018/0131645 A1 | 5/2018 | Magliozzi et al. |
| 2021/0150385 A1* | 5/2021 | Mallette .............. G06F 16/3329 |
| 2022/0229993 A1* | 7/2022 | Vu .......................... G06F 40/40 |

OTHER PUBLICATIONS

Liu, Xiaodong, et al. "Multi-task deep neural networks for natural language understanding", Proceedings of the 57th Annual Meeting of the Association for Computational Linguistics, pp. 4487-4496, Aug. 2, 2019.

Haponchyk et al. "Supervised clustering of questions into intents for dialog system applications", Proceedings of the 2018 Conference on Empirical Methods in Natural Language Processing, pp. 2310-2321, Nov. 4, 2018.

Zhou et al., "Emotional chatting machine: Emotional conversation generation with internal and external memory", Proceedings of the AAAI Conference on Artificial Intelligence, vol. 32, No. 1, Apr. 4, 2018.

Devlin, Jacob, et al. "Bert: Pre-training of deep bidirectional transformers for language understanding", arXiv:1810.04805v2 [cs.CL] May 24, 2019.

\* cited by examiner

METHOD AND SYSTEM FOR GENERATING
AN INTENT CLASSIFIER

TECHNICAL FIELD

Example embodiments relate to natural language processing in the context of intent classification for chatbots and the like.

BACKGROUND

Chatbots (short for chatterbots) are automated chatting platforms between users and computing devices. Chatbots are conversational computer programs or applications that are designed to mimic written human speech. Chatbots may be considered one of the most promising interaction technologies between humans and computing devices. Chatbots play a considerable role in revolutionizing the way enterprises communicate with their users (customers). It is crucial to interact with users as quickly and clearly as possible in today's busy business environment.

Before chatbots existed, one option users had to communicate with an enterprise was to either call or email individuals from the enterprise. Now, several companies offer a chatbot that provides convenient and 24/7 customer service. Chatbots are especially appealing to enterprises that desire to be available to users all the time but do not have the financial resources to do so. Users can communicate with the enterprise using chatbot platforms the same way they would converse with another person.

The technology behind chatbots can be divided into two main streams: rule-based chatbots and artificial intelligence chatbots. For both types, chatbots usually have a set of questions and a respective intent for each question. For instance, when a user asks, "what's the status of my order?" the chatbot may classify the question to the intent "order status." Once the question is classified into an intent, the computing device of the chatbot proceeds to perform steps to provide answers related to the intent.

The rule-based chatbots provide the user with a pre-defined set of questions to ask. For example, "please let me know if you need help with an order status, an order invoice, or a price of a product." In response, certain keywords are parsed, and a predefined answer may be output. However, such types of chatbots cannot answer questions that are outside the defined rules. Therefore, rule-based chatbots have limited effectiveness.

Rule-based chatbots cannot learn on their own. The answers provided by rule-based chatbots rely heavily on the answers given by the individuals who implemented the rule-based chatbot. Yet, rule-based chatbots are sought-after approaches when consistency is desired. Given that rule-based chatbots cannot learn independently, they provide a consistent and uniform answer to the users. Sometimes, if the conversation enters an unknown field, the chatbot will pass the conversation to a human representative to handle the situation.

In contrast, AI chatbots are self-learning chatbots. These advanced bots operate through natural language processing (NLP). With NLP as the root of AI chatbots, such chatbots are designed to understand the context and purpose of a question before mapping out an answer. The more these chatbots are trained, the more they learn. Even though it takes time to train, AI chatbots can keep up with the user once properly trained and equipped. AI chatbots can be programmed to understand the emotions or current mood of a user. AI chatbots may also provide personalized services to each user if they are trained long enough. They may also understand and communicate in different languages.

With the advancement in AI, especially in natural language processing and computing devices, rule-based chatbots are diminishing and being replaced with AI chatbots.

There are still several limitations of chatbots, including AI chatbots. For example, the performance of chatbots depends on how the chatbots were trained, in the case of AI chatbots, or rules programmed with, in the case of rule-based chatbots. The chatbots may fail when a question has no corresponding intent. Further, asking grammatically wrong or using slang language may jeopardize the performance of the chatbot. Each question is usually mapped to one intent when training the AI chatbot or programming rules for rule-based chatbots. However, due to the dynamic of the language, a question may have multiple intents. For example, "What's the status of my order, and when is it expected to arrive?" This question has two intents, one regarding the status of the other and the other delivery time.

Accordingly, there is a need for methods and systems for training an intent classifier in chatbots for improved performance.

SUMMARY

Example embodiments relate to the training and generation of an intent classifier model. An example embodiment is a method and system for training the intent classifier, including fine-tuning a pre-trained language model in two stages. The pre-trained language model is a Bidirectional Encoder Representations from Transformers (BERT) model. The two stages generate a masked language modelling (MLM) of BERT model (referred to as MLM-BERT language model) and a multi-task deep neural network (MT-DNN) of BERT model (referred to as MT-DNN-BERT language model). The MLM-BERT language model is generated in a masked language modelling fine-tuning module, which uses a conversation dataset, an unlabeled dataset, to fine-tune the pre-trained language model, and generate the MLM-BERT language model. The MLM-BERT language model can better understand the particular use of language in a specific industry or domain (such as finance industry, education industry, logistics industry, telecommunication industry, etc.). Therefore, the MLM-BERT language model makes the pre-trained language model more domain-specific. The MLM-BERT language model is further fine-tuned in a multi-task deep neural network fine-tuning module to generate a multi-task deep neural network of BERT model (MT-DNN-BERT language model). The multi-task deep neural network fine-tuning module uses a question-intent tuple dataset, a labelled dataset, to fine-tune the MLM-BERT language model. The MT-DNN-BERT language model is used to train a support vector machine (SVM) classifier using the question-intent tuple dataset.

Example embodiments relate to a method for training an intent classification system. The method can receive a question-intent tuple dataset comprising data samples, each data sample of the question-intent tuple dataset having a question, an intent; and a task. Further, the method may obtain a pre-trained language model, the pre-trained language model being a pre-trained bidirectional encoder representations from transformers model. The pre-trained language model comprises a plurality of embedding layers comprising learnable parameters with values obtained with the pre-trained language model.

The method further generates a fine-tuned language model by adjusting values of the learnable parameters of the pre-trained language model. Adjusting values of the learnable parameters is performed by generating a plurality of neural network models using the question-intent tuple dataset. Each neural network model of the plurality of neural network models is trained to predict at least one intent of the respective question having a same task value of the tasks of the question-intent tuple dataset.

Further, the fine-tuned language model can generate embeddings for training input data. The input data comprises a plurality of data samples having questions and intents. Further, each task value represents a source of the question and the respective intent. Also, the method can generate feature vectors for the data samples of the training input data. The method can also generate an intent classification model for predicting at least one intent of the training input data using the feature vectors of the training input data.

In some aspects of the above example, the method generates the plurality of neural network models. The method for generating the plurality of neural network models includes, for data samples of the question-intent tuple dataset having the same task value, generates a neural network model configured to predict at least one intent for at least one question of the data sample of the question-intent tuple dataset. Generating the neural network model includes inputting the questions of the data samples of the question-intent tuple dataset having the same task value into the neural network model to forward propagate the questions of the data samples of the question-intent tuple dataset having the same task value. In response to forward propagating questions, the method generates at least one predicted intent for each question of the question-intent tuple dataset having the same task value.

Further, the method can compute a neural network model loss for the neural network model based on the at least one predicted intent and the respective at least one intent of the data samples of the question-intent tuple dataset having the same task value. Also, the method may back propagate the neural network model loss through the pre-trained language model to adjust values of the learnable parameters of the pre-trained language model. Lastly, in response to generating the neural network models for all unique task values, the pre-trained language model may become the fine-tuned language model.

In some aspects of the above method, the method further comprises fine-tuning values of the learnable parameters of the pre-trained language model by receiving a conversation dataset comprising data samples, each data sample of the conversation dataset having words. Further, the method tokenizes each data sample of the conversation dataset to generate a tokenized data sample comprising tokens. The method then masks at least one token of the tokenized data sample of the conversation dataset to generate a tokenized data sample with masked tokens. Further, the method generates, using the pre-trained language model, a predicted token for the at least one masked token. The method can also compute a masked language model loss for the pre-trained language model based on the predicted token and the respective token of the data sample of the conversation dataset. Lastly, the method may back propagate the masked language model loss through the pre-trained language model to adjust values of learnable parameters of the pre-trained language model.

In some aspects of the preceding method example on fine-tuning values of the learnable parameters of the pre-trained language model, the method may tokenize each data sample of the conversation dataset by separating each data sample into tokens. Each token is represented with a unique identifier.

In some aspects of any preceding method examples, each neural network model may comprise a plurality of layers. A first subset of layers of the plurality of layers is shared among all neural network models, and a second subset of layers of the plurality of layers is specific to each neural network model. The first subset of layers and the second subset of layers are disjoint. In some aspects of the previous example, the first subset of layers is the pre-trained language model. In some aspects of the previous example, input to the second subset of layers of each neural network model is output of a last embedding layer of the pre-trained language model.

In some aspects of any preceding method examples, the intent classification model can be generated by a support vector machine (SVM) classifier. In some aspects of any of the preceding method examples, the training input data can be the question-intent tuple dataset. In some aspects of any of the preceding method examples, the training input data can be an enterprise-specific dataset comprising a question and an intent.

In some aspects of any preceding method examples, the fine-tuned language model comprises a plurality of embedding layers. The feature vector for each data sample of the enterprise-specific dataset can be generated by inputting the questions of the data samples of the enterprise-specific dataset into the fine-tuned language model. Further, the method can obtain, for each data sample of the enterprise-specific dataset, embeddings from a subset of the plurality of embedding layers of the fine-tuned language model. Each embedding may comprise token embeddings with an embedding for each token. Also, the method can generate a concatenated embedding by concatenating the embeddings from the subset of the plurality of embedding layers. The method can then generate the feature vector by computing an average of the token embeddings.

In some aspects of any preceding method examples, the method is performed by at least one processor. In some aspects of any preceding method example, the source of the task value is the industry where the questions and intents of the task value are collected from.

In various examples, an intent classification computer program product by an intent classifier training process is disclosed. The computer program product comprises instructions stored in a non-transitory computer-readable medium which, when executed by at least one processor, causes the at least one processor to perform intent classification. The intent classifier training process can receive a question-intent tuple dataset comprising data samples, each data sample of the question-intent tuple dataset having a question, an intent; and a task. Further, the intent classification computer program product can obtain a pre-trained language model, the pre-trained language model being a pre-trained bidirectional encoder representations from transformers model. The pre-trained language model may comprise a plurality of embedding layers comprising learnable parameters with values obtained with the pre-trained language model.

The intent classification computer program product can further generate a fine-tuned language model by adjusting values of the learnable parameters of the pre-trained language model. Adjusting values of the learnable parameters can be performed by generating a plurality of neural network models using the question-intent tuple dataset. Each neural network model of the plurality of neural network models is trained to predict at least one intent of the respective question having a same task value of the tasks of the question-intent tuple dataset.

Further, the intent classification computer program product can use the fine-tuned language model to generates embeddings for training input data. The input data may comprise a plurality of data samples having questions and intents. Further, each task value represents a source of the question and the respective intent. Also, the intent classification computer program product can generate feature vectors for the data samples of the training input data. The intent classification computer program product can also generate an intent classification model for predicting at least one intent of the training input data using the feature vectors of the training input data.

In some aspects of the above example, the intent classification computer program product generates the plurality of neural network models as follows. For data samples of the question-intent tuple dataset having the same task value, the intent classification computer program product can generate a neural network model configured to predict at least one intent for at least one question of the data sample of the question-intent tuple dataset. Generating the neural network model includes inputting the questions of the data samples of the question-intent tuple dataset having the same task value into the neural network model to forward propagate the questions of the data samples of the question-intent tuple dataset having the same task value. In response to forward propagating questions, the intent classification computer program product can generate at least one predicted intent for each question of the question-intent tuple dataset having the same task value.

Further, the intent classification computer program product can compute a neural network model loss for the neural network model based on the at least one predicted intent and the respective at least one intent of the data samples of the question-intent tuple dataset having the same task value. Also, the intent classification computer program product back propagates the neural network model loss through the pre-trained language model to adjust values of the learnable parameters of the pre-trained language model. Lastly, in response to generating the neural network models for all unique task values, the pre-trained language model may become the fine-tuned language model.

In some aspects of the above intent classification computer program product, the intent classification computer program product further comprises fine-tuning values of the learnable parameters of the pre-trained language model by receiving a conversation dataset comprising data samples, each data sample of the conversation dataset having words. Further, the intent classification computer program product tokenizes each data sample of the conversation dataset to generate a tokenized data sample comprising tokens. The intent classification computer program product then masks at least one token of the tokenized data sample of the conversation dataset to generate a tokenized data sample with masked tokens. Further, the intent classification computer program product generates, using the pre-trained language model, a predicted token for the at least one masked token. The intent classification computer program product also computes a masked language model loss for the pre-trained language model based on the predicted token and the respective token of the data sample of the conversation dataset. Lastly, the intent classification computer program product may back propagate the masked language model loss through the pre-trained language model to adjust values of learnable parameters of the pre-trained language model.

In some aspects of any preceding intent classification computer program product examples, each neural network model comprises a plurality of layers. A first subset of layers of the plurality of layers is shared among all neural network models, and a second subset of layers of the plurality of layers is specific to each neural network model. The first subset of layers and the second subset of layers are disjoint. In some aspects of any preceding intent classification computer program product examples, the first subset of layers can be the pre-trained language model. In some aspects of any preceding intent classification computer program product examples, the intent classification model can be generated by a support vector machine (SVM) classifier. In some aspects of any preceding intent classification computer program product examples, the source of the task value can be the industry where the questions and intents of the task value are collected from.

In various examples, a system for training an intent classifier is disclosed. The system comprises a memory; and a processing device in communication with the memory, the processing device configured to execute instructions to cause the computing system to receive a question-intent tuple dataset comprising data samples, each data sample of the question-intent tuple dataset having a question, an intent; and a task. The processing device configured to execute instructions to further cause the computing system to obtain a pre-trained language model, the pre-trained language model being a pre-trained bidirectional encoder representations from transformers model. The pre-trained language model can comprise a plurality of embedding layers comprising learnable parameters with values obtained with the pre-trained language model.

The processing device configured to execute instructions to further cause the computing system to generate a fine-tuned language model by adjusting values of the learnable parameters of the pre-trained language model. Adjusting values of the learnable parameters can be performed by generating a plurality of neural network models using the question-intent tuple dataset. Each neural network model of the plurality of neural network models can be trained to predict at least one intent of the respective question having a same task value of the tasks of the question-intent tuple dataset.

Further, the fine-tuned language model generates embeddings for training input data. The input data comprises a plurality of data samples having questions and intents. Further, each task value represents a source of the question and the respective intent. Also, the processing device configured to execute instructions to further cause the computing system to generate feature vectors for the data samples of the training input data. The processing device configured to execute instructions to cause the computing system to generate an intent classification model for predicting at least one intent of the training input data using the feature vectors of the training input data.

In some aspects of the above system example, the system can generate the plurality of neural network models as follows. For data samples of the question-intent tuple dataset having the same task value, the system can generate a neural network model configured to predict at least one intent for at least one question of the data sample of the question-intent tuple dataset. Generating the neural network model can include inputting the questions of the data samples of the question-intent tuple dataset having the same task value into the neural network model to forward propagate the questions of the data samples of the question-intent tuple dataset having the same task value. In response to forward propagating questions, the system can generate at least one predicted intent for each question of the question-intent tuple dataset having the same task value.

Further, the system can compute a neural network model loss for the neural network model based on the at least one predicted intent and the respective at least one intent of the data samples of the question-intent tuple dataset having the same task value. Also, the system back can propagate the neural network model loss through the pre-trained language model to adjust values of the learnable parameters of the pre-trained language model. Lastly, in response to generating the neural network models for all unique task values, the pre-trained language model may become the fine-tuned language model.

In some aspects of the above system, the system comprises fine-tuning values of the learnable parameters of the pre-trained language model by receiving a conversation dataset comprising data samples, each data sample of the conversation dataset having words. Further, the system can tokenize each data sample of the conversation dataset to generate a tokenized data sample comprising tokens. The system then can mask at least one token of the tokenized data sample of the conversation dataset to generate a tokenized data sample with masked tokens. Further, the system can generate, using the pre-trained language model, a predicted token for the at least one masked token. The system can also compute a masked language model loss for the pre-trained language model based on the predicted token and the respective token of the data sample of the conversation dataset. Lastly, the system may back propagate the masked language model loss through the pre-trained language model to adjust values of learnable parameters of the pre-trained language model.

In some aspects of any preceding system examples, each neural network model comprises a plurality of layers. A first subset of layers of the plurality of layers is shared among all neural network models, and a second subset of layers of the plurality of layers is specific to each neural network model. The first subset of layers and the second subset of layers are disjoint. In some aspects of any preceding system examples, the first subset of layers can be the pre-trained language model. In some aspects of any preceding system examples, the intent classification model can be generated by a support vector machine (SVM) classifier. In some aspects of any preceding system examples, the source of the task value can be the industry where the questions and intents of the task value are collected from.

In various examples, an non-transitory computer-readable medium storing instruction is disclosed. The instructions, when executed by at least one processor, causes the at least one processor to receive a question-intent tuple dataset comprising data samples, each data sample of the question-intent tuple dataset having a question, an intent; and a task. The instructions, when executed by at least one processor, causes the processor to obtain a pre-trained language model, the pre-trained language model being a pre-trained bidirectional encoder representations from transformers model. The pre-trained language model comprises a plurality of embedding layers comprising learnable parameters with values obtained with the pre-trained language model.

The instructions, when executed by at least one processor, further causes the processor to generate a fine-tuned language model by adjusting values of the learnable parameters of the pre-trained language model. Adjusting values of the learnable parameters can be performed by generating a plurality of neural network models using the question-intent tuple dataset. Each neural network model of the plurality of neural network models is trained to predict at least one intent of the respective question having a same task value of the tasks of the question-intent tuple dataset.

Further, the fine-tuned language model can generate embeddings for training input data. The input data comprises a plurality of data samples having questions and intents. Further, each task value represents a source of the question and the respective intent. Also, the instructions, when executed by at least one processor, further causes the processor to generate feature vectors for the data samples of the training input data. The instructions, when executed by at least one processor, causes the processor to generate an intent classification model for predicting at least one intent of the training input data using the feature vectors of the training input data.

In some aspects of the above non-transitory computer-readable medium, the instructions, when executed by at least one processor, causes the processor to generate the plurality of neural network models as follows. For data samples of the question-intent tuple dataset having the same task value, the non-transitory computer-readable medium can generate a neural network model configured to predict at least one intent for at least one question of the data sample of the question-intent tuple dataset. Generating the neural network model includes inputting the questions of the data samples of the question-intent tuple dataset having the same task value into the neural network model to forward propagate the questions of the data samples of the question-intent tuple dataset having the same task value. In response to forward propagating questions, the non-transitory computer-readable medium can generate at least one predicted intent for each question of the question-intent tuple dataset having the same task value.

Further, the non-transitory computer-readable medium can compute a neural network model loss for the neural network model based on the at least one predicted intent and the respective at least one intent of the data samples of the question-intent tuple dataset having the same task value. Also, the non-transitory computer-readable medium back propagates the neural network model loss through the pre-trained language model to adjust values of the learnable parameters of the pre-trained language model. Lastly, in response to generating the neural network models for all unique task values, the pre-trained language model may become the fine-tuned language model.

In some aspects of any preceding non-transitory computer-readable medium examples, the source of the task value can be the industry where the questions and intents of the task value are collected from.

BRIEF DESCRIPTION OF THE DRAWINGS

Reference will now be made, by way of example, to the accompanying drawings which show example embodiments, and in which.

DETAILED DESCRIPTION

Figure 1:
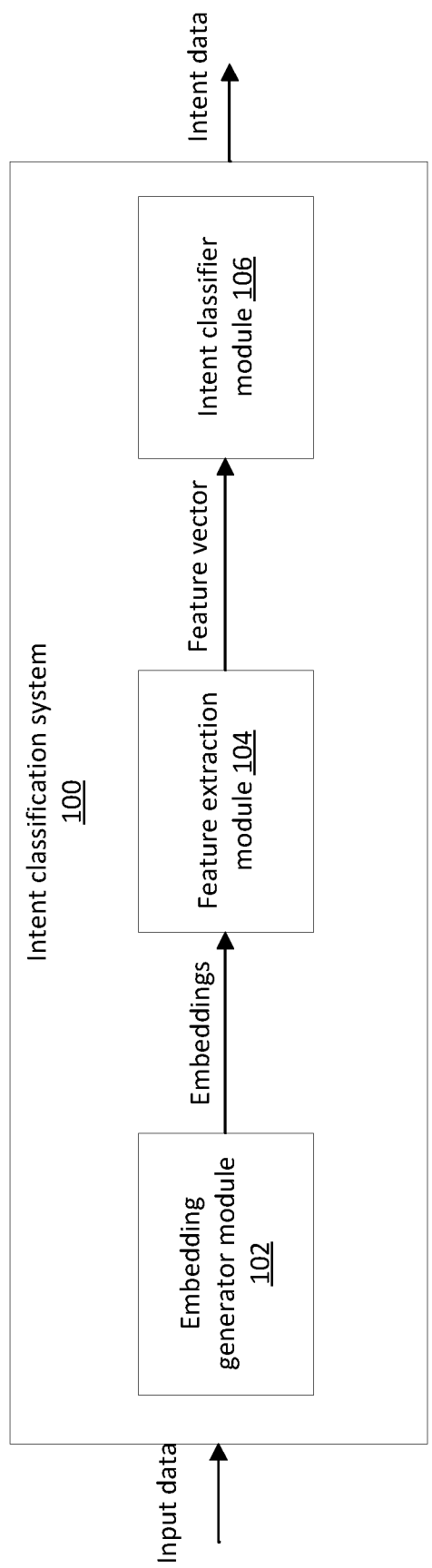
FIG. 1 illustrates a data flow diagram of an example intent classification method for an inference task, the method being performed by and implemented in an intent classification system, according to example embodiments.

Example embodiments describe a method for training an intent classification system. The method includes receiving a question-intent tuple dataset comprising data samples, each data sample of the question-intent tuple dataset having a question, an intent, and a task. Further, the method obtains a pre-trained language model, the pre-trained language model being a pre-trained bidirectional encoder representations from transformers (BERT) model. Next, the method generates two fine-tuned language models by adjusting values of learnable parameters of the pre-trained language model. One fine-tuned model is generated in the masked language modelling fine-tuning module and referred to as the masked language modelling of the BERT language model (MLM-BERT language model). The other fine-tuned model, which fine-tunes the MLM-BERT language model, is the multi-task deep neural network of BERT language model (MT-DNN-BERT language model), generated in the multi-task deep neural network fine-tuning module. The method further generates an intent classification model using feature vectors extracted from an enterprise-specific dataset, the features being extracted from the output of the MT-DNN-BERT language model.

Various examples include a method for training an intent classification system. The method may receive a question-intent tuple dataset comprising data samples, each data sample of the question-intent tuple dataset having a question, an intent; and a task. Further, the method may obtain a pre-trained language model, the pre-trained language model being a pre-trained bidirectional encoder representations from transformers model. The pre-trained language model comprises a plurality of embedding layers comprising learnable parameters with values obtained with the pre-trained language model.

The method further generates a fine-tuned language model by adjusting values of the learnable parameters of the pre-trained language model. Adjusting values of the learnable parameters is performed by generating a plurality of neural network models using the question-intent tuple dataset. Each neural network model of the plurality of neural network models is trained to predict at least one intent of the respective question having a same task value of the tasks of the question-intent tuple dataset.

Further, the fine-tuned language model can generate embeddings for training input data. The input data comprises a plurality of data samples having questions and intents. Further, each task value represents a source of the question and the respective intent. Also, the method can generate feature vectors for the data samples of the training input data. The method can also generate an intent classification model for predicting at least one intent of the training input data using the feature vectors of the training input data.

In various examples, an intent classification computer program product by an intent classifier training process is disclosed. The computer program product comprises instructions stored in a non-transitory computer-readable medium which, when executed by at least one processor, causes the at least one processor to perform intent classification. The intent classifier training process can receive a question-intent tuple dataset comprising data samples, each data sample of the question-intent tuple dataset having a question, an intent; and a task. Further, the intent classification computer program product can obtain a pre-trained language model, the pre-trained language model being a pre-trained bidirectional encoder representations from transformers model. The pre-trained language model may comprise a plurality of embedding layers comprising learnable parameters with values obtained with the pre-trained language model.

The intent classification computer program product can further generate a fine-tuned language model by adjusting values of the learnable parameters of the pre-trained language model. Adjusting values of the learnable parameters can be performed by generating a plurality of neural network models using the question-intent tuple dataset. Each neural network model of the plurality of neural network models is trained to predict at least one intent of the respective question having a same task value of the tasks of the question-intent tuple dataset.

Further, the intent classification computer program product can use the fine-tuned language model to generates embeddings for training input data. The input data may comprise a plurality of data samples having questions and intents. Further, each task value represents a source of the question and the respective intent. Also, the intent classification computer program product can generate feature vectors for the data samples of the training input data. The intent classification computer program product can also generate an intent classification model for predicting at least one intent of the training input data using the feature vectors of the training input data.

In various examples, a system for training an intent classifier is disclosed. The system comprises a memory; and a processing device in communication with the memory, the processing device configured to execute instructions to cause the computing system to receive a question-intent tuple dataset comprising data samples, each data sample of the question-intent tuple dataset having a question, an intent; and a task. The processing device configured to execute instructions to further cause the computing system to obtain a pre-trained language model, the pre-trained language model being a pre-trained bidirectional encoder representations from transformers model. The pre-trained language model can comprise a plurality of embedding layers comprising learnable parameters with values obtained with the pre-trained language model.

The processing device configured to execute instructions to further cause the computing system to generate a fine-tuned language model by adjusting values of the learnable parameters of the pre-trained language model. Adjusting values of the learnable parameters can be performed by generating a plurality of neural network models using the question-intent tuple dataset. Each neural network model of the plurality of neural network models can be trained to predict at least one intent of the respective question having a same task value of the tasks of the question-intent tuple dataset.

Further, the fine-tuned language model generates embeddings for training input data. The input data comprises a plurality of data samples having questions and intents. Further, each task value represents a source of the question and the respective intent. Also, the processing device configured to execute instructions to further cause the computing system to generate feature vectors for the data samples of the training input data. The processing device configured to execute instructions to cause the computing system to generate an intent classification model for predicting at least one intent of the training input data using the feature vectors of the training input data.

In various examples, an non-transitory computer-readable medium storing instruction is disclosed. The instructions, when executed by at least one processor, causes the at least one processor to receive a question-intent tuple dataset comprising data samples, each data sample of the question-intent tuple dataset having a question, an intent; and a task. The instructions, when executed by at least one processor, causes the processor to obtain a pre-trained language model, the pre-trained language model being a pre-trained bidirectional encoder representations from transformers model. The pre-trained language model comprises a plurality of embedding layers comprising learnable parameters with values obtained with the pre-trained language model.

The instructions, when executed by at least one processor, further causes the processor to generate a fine-tuned language model by adjusting values of the learnable parameters of the pre-trained language model. Adjusting values of the learnable parameters can be performed by generating a plurality of neural network models using the question-intent tuple dataset. Each neural network model of the plurality of neural network models is trained to predict at least one intent of the respective question having a same task value of the tasks of the question-intent tuple dataset.

Further, the fine-tuned language model can generate embeddings for training input data. The input data comprises a plurality of data samples having questions and intents. Further, each task value represents a source of the question and the respective intent. Also, the instructions, when executed by at least one processor, further causes the processor to generate feature vectors for the data samples of the training input data. The instructions, when executed by at least one processor, causes the processor to generate an intent classification model for predicting at least one intent of the training input data using the feature vectors of the training input data.

FIG. 1 illustrates a data flow diagram of an example intent classification method for an inference task. The intent classification method for the inference task is performed by and implemented in an intent classification system 100, according to example embodiments. Since the example embodiment in FIG. 1 is for an inference task, all machine learning and artificial intelligence models are configured during training to perform the desired inference task. Training is a process in machine learning and artificial intelligence that generates a model with learnable parameters optimized on a training dataset to perform a task (e.g. generating a chatbot model that analyzes questions and categorizes the questions into intents for further processing). Inference, on the other hand, is a process in machine learning and artificial intelligence that uses the model generated in training to perform the task (e.g. using the generated chatbot model at run-time to analyze questions asked by users and categorize the questions into intents).

The intent classification system 100 receives input data of a question such as, "what is my order status," "I need to make a payment," "Can I get a refund on a duplicate payment?" etc. After processing the input data, the intent classification system 100 outputs intent data, classifying each question into an intent. In other words, the intent classification system 100 predicts an intent for the input data. For instance, predicted intents for the above questions may be "order status," "making payment," and "duplicate payment." Further, each intent may represent multiple questions. For example, "How do I get my money back?", "What's your refund policy?", can both within the "refund" intent. The intent is a label to a question. It will be appreciated that the intent need not be a human-understandable text (e.g. order status), but it may be an alphanumeric string, a number, or any string representing the label.

Also, the term "question" may not include a question in the strict sense but may be a sentence making a statement. The question is a term to refer to a query asked by the user. For instance, a question may be "I want a refund" which can also have the "refund" intent. Further, the term "question" may be used interchangeably with the term "input data."

The intent classification system 100 includes three modules: an embedding generator module 102, a feature extraction module 104, and an intent classifier module 106. The embedding generator module 102 includes an MT-DNN-BERT language model that uses machine learning and artificial intelligence. The MT-DNN-BERT language model is generated during training and is described in detail below. The output of the embedding generator module 102 comprises embeddings, each embedding being a three-dimensional matrix that includes token embeddings, described in detail below. Each embedding is a unique representation of the input data.

The feature extraction module 104 implements a method to extract a feature vector from the embeddings outputted by the embedding generator module 102. The method performed by the feature extraction module 104 is described in detail in FIG. 5. The intent classifier module 106 includes an intent classifier model that uses machine learning and artificial intelligence. The intent classifier model is generated during training. The intent classifier model receives feature vectors of the question from the feature extraction module 104 and predicts and outputs the intent.

Figure 2:
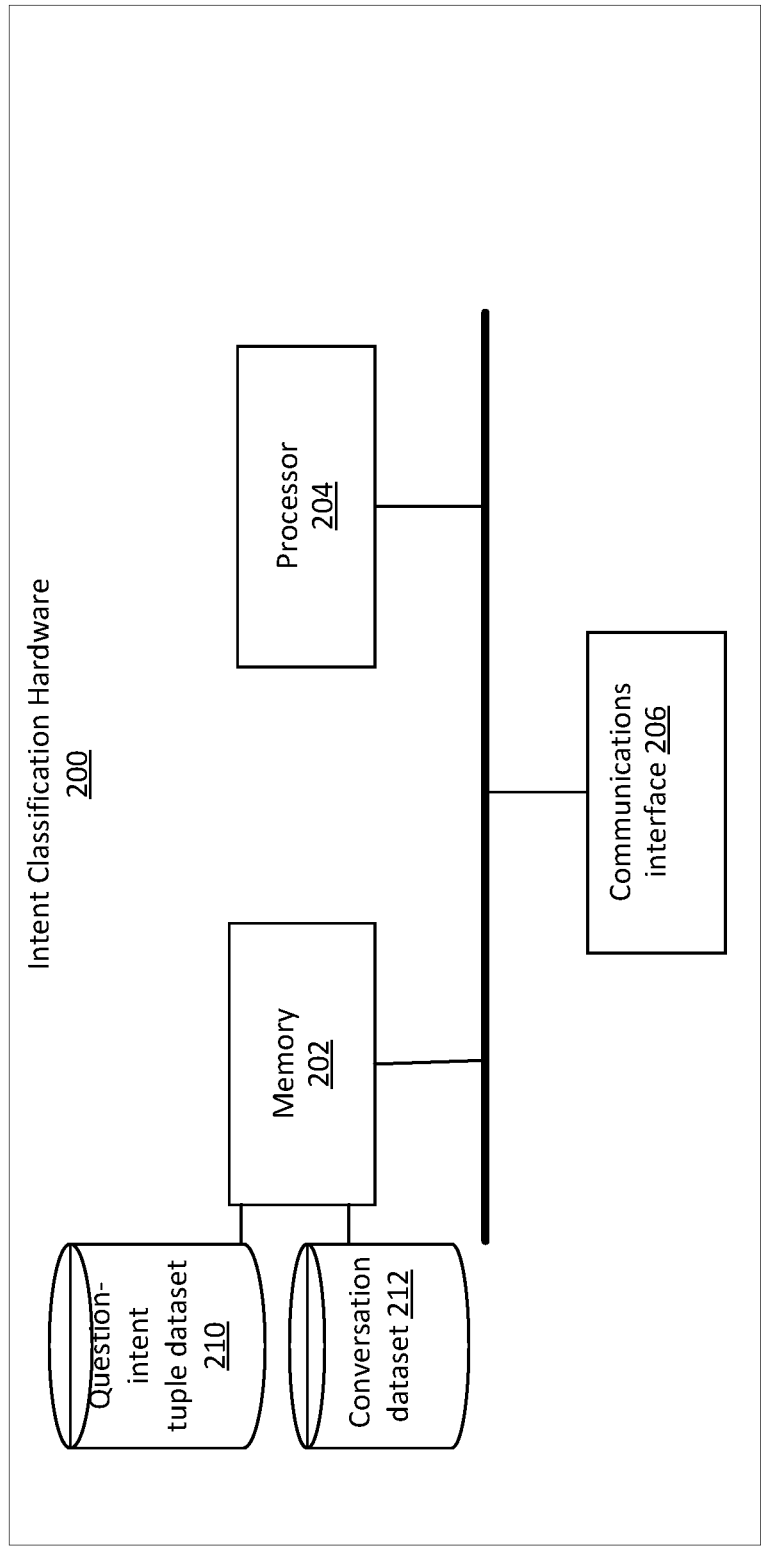
FIG. 2 is a schematic diagram of hardware implementing the intent classification system, according to example embodiments.

FIG. 2 is a schematic diagram of hardware implementing the intent classification system 100, according to example embodiments. The intent classification hardware 200 includes a memory 202, a processor 204, and a communications interface 206. A communication connection is implemented between the memory 202, the processor 204, and the communications interface 206, for example, using a bus. The processor 204 is configured to perform, when the computer program stored in the memory 202 is executed by the processor 204, steps of the intent classification method for an inference task as detailed in FIG. 1 and steps of the intent classification method during training as described in FIGS. 3, 4, 6, and 7 below.

The memory 202 can be a read-only memory (Read-Only Memory, ROM), a static storage device, a dynamic storage device, or a random access memory (Random Access Memory, RAM). The memory 202 may store a computer program. The memory 202 can be a non-transitory memory. The memory 202 can be external or removable in some examples. In an example, the memory 202 includes the question-intent tuple dataset 210. In an example, the memory 202 includes the conversation dataset 212. In other examples, the question-intent tuple dataset 210 is external to intent classification hardware 200.

The processor 204 can be a general central processing unit (Central Processing Unit, CPU), a microprocessor, an application-specific integrated circuit (Application Specific Integrated Circuit, ASIC), a graphics processing unit (graphics processing unit, GPU), or one or more integrated circuits. The processor 204 may be an integrated circuit chip with a signal processing capability. In an implementation process, steps of the intent classification method during training or inference making as described herein can be performed by an integrated logical circuit in a form of hardware or by an instruction in a form of a computer program in the processor 204. In addition, the processor 204 can be a general-purpose processor, a digital signal processor (Digital Signal Processor, DSP), an ASIC, a field-programmable gate array (Field Programmable Gate Array, FPGA) or another programmable logic device, a discrete gate or a transistor logic device, or a discrete hardware assembly. The processor 204 can implement or execute the methods, steps, and logical block diagrams that are described in example embodiments. The general-purpose processor can be a microprocessor, or the processor may be any conventional processor or the like. The steps of the intent classification method during training or inference making may be directly performed by a hardware decoding processor or may be performed by using a combination of hardware in the decoding processor and a computer program module. The computer program module may be located in a mature storage medium in the art, such as a random access memory, a flash memory, a read-only memory, a programmable read-only memory, an electrically erasable programmable memory, or a register. The storage medium is located in the memory 202. The processor 204 reads information from the memory 202, and completes, by using hardware in the processor 204, the steps of the intent classification method during training or inference making.

The communications interface 206 implements communication between the intent classification hardware 200 and another device or communications network using a transceiver apparatus, including but not limited to a transceiver. For example, the training dataset (i.e. the question-intent tuple dataset 210 or the conversation dataset 212) may be obtained using the communications interface 206.

It should be noted that, although the memory 202, the processor 204, and the communications interface 206 are shown in the intent classification hardware 200 in FIG. 2, in a specific implementation process, a person skilled in the art should understand that the intent classification hardware 200 may further include other components that are necessary for implementing normal running. In addition, based on specific needs, a person skilled in the art should understand that the intent classification hardware 200 may further include hardware components that implement other additional functions. In addition, a person skilled in the art should understand that the intent classification hardware 200 may include only a component required for implementing the embodiments, without a need to include all the components shown in FIG. 2.

Figure 3:
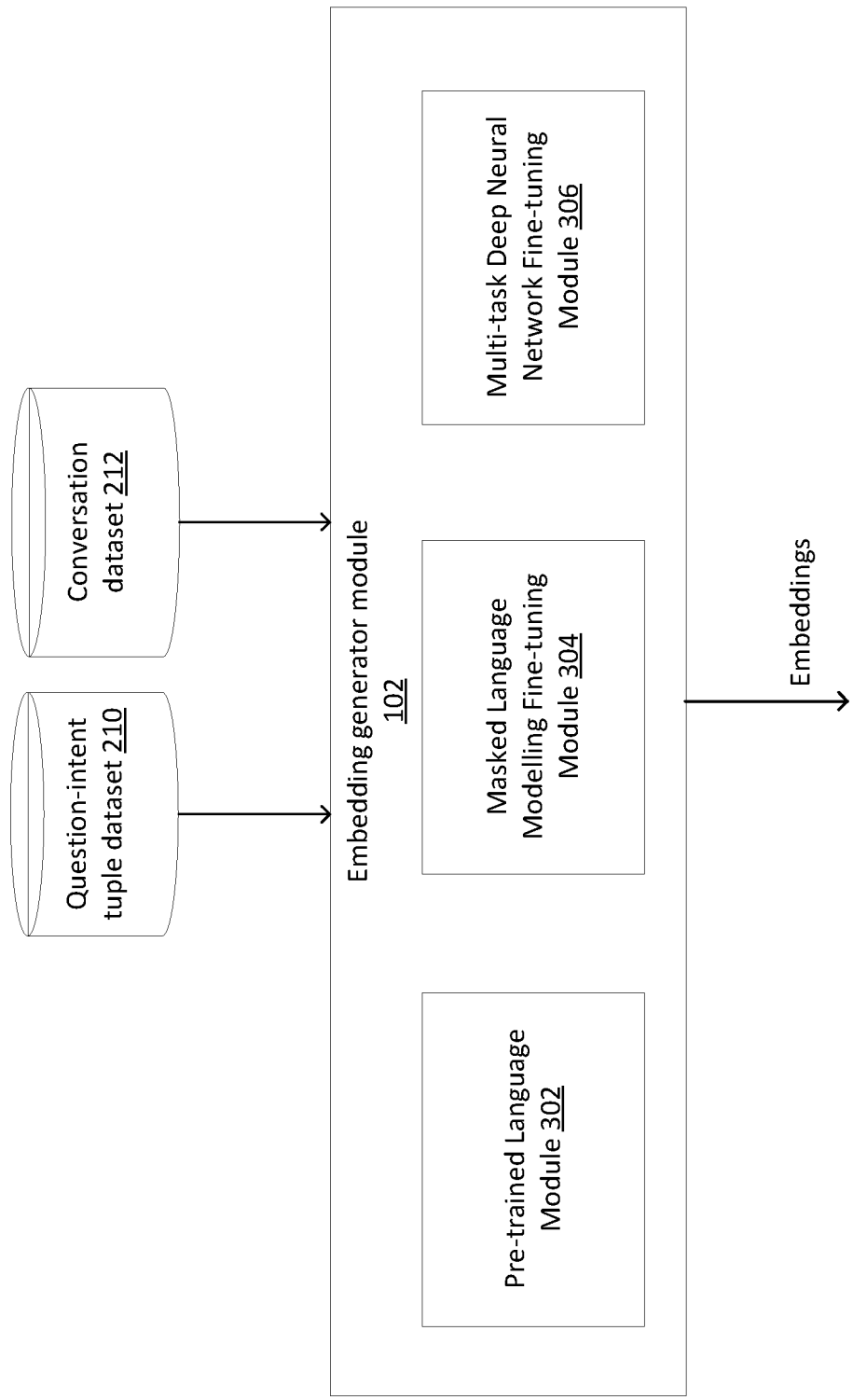
FIG. 3 illustrates a block diagram of an example method implemented in the embedding generator module during training, according to example embodiments.

FIG. 3 illustrates a block diagram of an example method of the embedding generator module during training. FIG. 1 describes the embedding generator module 102 during inference making (i.e. performing an inference task). As described above, the embedding generator module 102 includes the MT-DNN-BERT language model generated, through training, to achieve a specific task (e.g. predict intents). FIG. 3 describes an example method for generating, through training, the MT-DNN-BERT language model. The training requires training datasets, which contain texts (e.g. questions, interchangeably, input data). Two training datasets can be used to generate the MT-DNN-BERT language model, the question-intent tuple dataset 210 and the conversation dataset 212. The question-intent tuple dataset 210 is a labelled dataset consisting of data samples, each data sample having a question, an intent, and a task. The questions are text questions asked by users of chatbots. The intents are unique identifiers representing coherent groups of questions, as described above. Each question is usually mapped to a single intent. These questions and intents may be collected from different sources (e.g. chatbots) across different domains and industries (e.g. finance, logistics, education, transportation, etc.). The data samples, including questions and intents, of each source are assigned a unique task. Therefore, each data sample includes a question, an intent for the question, and a task representing the source (chatbot from an enterprise). Typically, data samples collected from a same source (same source chatbot) have a same task value. Data samples collected from the same industry are from the same source, hence, have a same task value. In other words, the question-intent tuple dataset 210 comprises a plurality of sub-datasets; each sub-dataset is collected from a source. For example, data samples collected from chatbot 1 may be assigned with a task value of 1, data samples collected from chatbot 2 may be assigned with a task value of 2, etc. The conversation dataset 212 is an unlabelled dataset that comprises data samples of conversation messages collected from users of chatbots.

The embedding generator module 102 and its components are now described. It receives training datasets as input and outputs embeddings for data samples. The embedding generator module 102 includes three modules, a pre-trained language module 302, a masked language modelling fine-tuning module 304, and a multi-task deep neural network fine-tuning module 306. The pre-trained language module 302 includes a pre-trained language model that uses machine learning and artificial intelligence. The pre-trained language model may be BERT, which is a bidirectional encoder representations from transformers proposed by Devlin, Jacob, et al. "Bert: Pre-training of deep bidirectional transformers for language understanding." arXiv preprint arXiv: 1810.04805 (2018), incorporated by reference herein in its entirety.

The pre-trained language model, BERT in some examples, is a machine-learning based embedding generation technique. The pre-trained language model comprises a plurality of embedding layers, each generating an embedding. Each embedding layer performs computations on the embedding of the previous embedding layer. Therefore, the pre-trained language model receives a word or a collection of words and generates embeddings for each word and the collection of words. Each question of a data sample of the question-intent tuple dataset 210 or a data sample of the conversation dataset 212 may be called a sentence, which is a plurality of words. The words of a sentence typically have a relationship to each other based on their relative positions in a sequence of words (e.g., in a sentence). The sentence may also include non-words, such as symbols (e.g., "?", "!", "@", "#", and other punctuation marks), whitespace or numeric characters.

The pre-trained language module 302 can also include a tokenizer (not shown) that tokenizes each sentence, wherein tokenization is a technique that separates the sentence into units referred to as tokens. For example, the sentence may be the text string "Hello, check order!". This sentence may be tokenized into the tokens "Hello", "check", and "order". Each token is represented with a unique identifier (ID). The pre-trained language model may further process the tokenized sentence into a dense vector representation of each token, referred to as a token embedding. Therefore, an embedding is a numerical matrix representation of a sentence. Each embedding comprises a plurality of token embedding. Each token embedding is a numerical vector representation of a token. Further, each embedding has a separate token called a classification token representing the sentence as a whole.

The tokenized words are provided to the pre-trained language model to generate embeddings. Embeddings of semantically related tokens are closer to each other in a vector space (where the vector space is defined by all embeddings generated from sentences). For example, a first embedding representing the token "Hello" and a second embedding representing the token "Hi" should be closer to each other in the vector space when compared to the distance between the first embedding representing the token "Hello" and a third embedding representing the token "Dog."

The dimensionality of each embedding depends on the pre-trained language model used to generate the embedding; in particular, the vector length of the token embedding depends on the number of hidden units per embedding layer of the pre-trained language model. The dimensionality of all token embeddings may be the same. An example embodiment can use BERT-Large Uncased (24 embedding layers, 1024 hidden units), BERT-Large Cased (24 embedding layers, 1024 hidden units), BERT-Base Uncased (12 embedding layers, 768 hidden units), BERT-Large Uncased (24 embedding layers, 1024 hidden units), BERT-Base Cased (12 embedding layers, 768 hidden units), and BERT-Large Cased (24 embedding layers, 1024 hidden units), all these pre-trained language models are generated by Google™, and available at (Google Research, http://github.com/google-research/bert, Mar. 11, 2020), all of which are incorporated by reference herein in their entirety. It is understood that the disclosed pre-trained language models can be used in some examples. Other pre-trained language models can be used in other examples.

The pre-trained language model comprises a plurality of learnable parameters optimized through training on general, perhaps public, training datasets. However, the model can be fine-tuned to better understand a particular use of language in a specific domain (e.g. finance, education, etc.). The process of fine-tuning adjusts the values of the learnable parameters of the pre-trained language model. In example embodiments, the pre-trained language model is fine-tuned twice, once in the masked language modelling fine-tuning module 304 to generate the masked language modelling of BERT language model (referred to as MLM-BERT language model). The MLM-BERT language model can be further fine-tuned in the multi-task deep neural network fine-tuning module 306 to generate the multi-task deep neural network of BERT language model (referred to as MT-DNN-BERT language model).

The masked language modelling fine-tuning module 304 uses the conversation dataset 212 as the training dataset for fine-tuning the pre-trained language model. The masked language modelling fine-tuning module 304 tokenizes the conversation dataset's 212 data samples to generate tokenized data samples of the conversation dataset 212. Further, the masked language modelling fine-tuning module 304 masks at least one token of the tokenized data samples. While fine-tuning the pre-trained language model to generate the MLM-BERT language model, the pre-trained language model is tasked to predict the masked token, and a masked language model loss is computed. The masked language model loss is computed for the pre-trained language model based on the predicted token and the respective token of the data sample of the conversation dataset 212. The respective token of the data sample is the token without the mask. The masked language model loss is a loss function calculated through forward propagation of the tokenized data samples with masked tokens. The masked language model loss is backpropagated through the pre-trained language model to adjust values of learnable parameters of the pre-trained language model and reduce the masked language model loss. This process is done iteratively. With each iteration, the masked language model loss decreases until the values of the learnable parameters of the pre-trained language model are optimized on the conversation dataset 212. After the pre-trained language model is fine-tuned in the masked language modelling fine-tuning module 304, such fine-tuned pre-trained model is referred to as the MLM-BERT language model.

After generating the MLM-BERT language model, the processor 204 provides the MLM-BERT language model to the multi-task deep neural network fine-tuning module 306 for a second fine-tuning stage. The multi-task deep neural network fine-tuning module 306 uses the question-intent tuple dataset 210 to fine-tune the MLM-BERT language model. The question-intent tuple dataset 210 includes data samples of questions, intents, and tasks. The multi-task deep neural network fine-tuning module 306 generates a multi-task deep neural network model for the tasks in the question-intent tuple dataset 210. The multi-task deep neural network model consists of a plurality of neural network models; each neural network model is trained on data samples of a unique task value of the tasks of the question-intent tuple dataset 210. For instance, if there are I data samples, each data sample has a task, so I task values. The I task values are comprised of T unique task values. Therefore, the multi-task deep neural network model consists of T neural network models.

The multi-task deep neural network fine-tuning module 306 implements a method to generate the multi-task deep neural network model. Example embodiments include training the neural network models in parallel where all neural network models, each for a unique task value, are trained concurrently. Other example embodiments include training the neural network models in series by generating a neural network for one unique task value at a time.

Neural networks will be briefly described in general terms. A neural network can include multiple layers of neurons, each neuron receiving inputs from a previous layer, applying a set of weights to the inputs, and combining these weighted inputs to generate an output, which can, in turn, be provided as input to one or more neurons of a subsequent layer.

A layer of neurons uses filters to define the relationship between the outputs of the neurons of the previous layer and the outputs of the neurons of the current layer. A layer of the neural network receives data input, usually in the form of a data array of known dimensions. By applying the set of filters (layers) to the data input, each layer generates data output, typically a data array with known dimensions. A filter comprises a set of weights (also learnable parameters).

In the example of a neural network, training a neural network involves learning or determining the appropriate weight values throughout the network. After being optimally trained to perform a given inference task, the neural network's weights will not all contribute equally to the final inference outputs. Some weights will have high value due to their high contribution, while others will have low value due to their low contribution.

Figure 4:
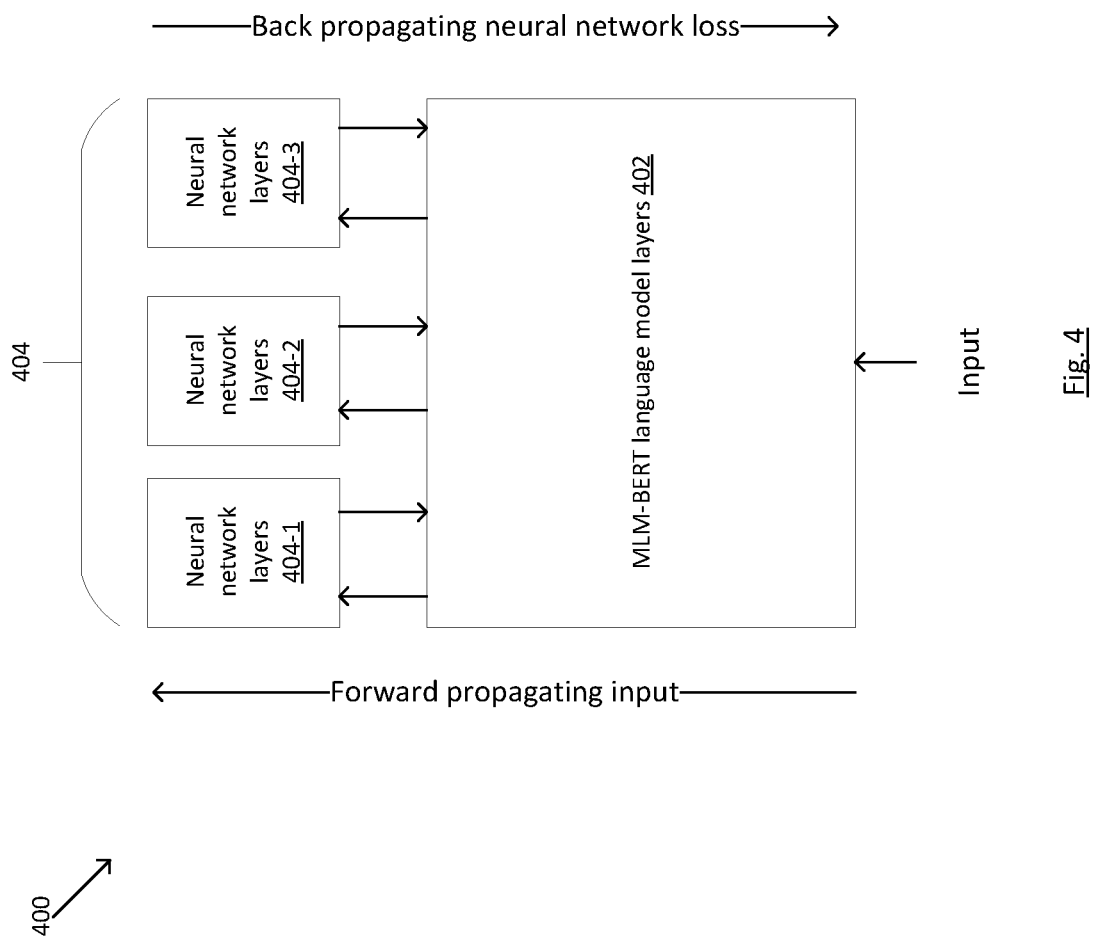
FIG. 4 is a data flow diagram illustrating the fine-tuning method performed in the multi-task deep neural network module, according to example embodiments.

FIG. 4 is a data flow diagram illustrating the fine-tuning method performed in the multi-task deep neural network fine-tuning module 306. The fine-tuning method 400 is performed in the multi-task deep neural network fine-tuning module 306, which includes MLM-BERT language model layers 402 and a plurality of neural network layers 404. Each neural network layers 404-1, 404-2, 404-3 belongs to, and part of, a respective neural network model trained to predict intents from questions. The multi-task deep neural network fine-tuning module 306 receives data samples of the question intent tuple dataset 210 as input and generates a neural network model for every unique task value. The input is forward propagated from a first layer of the MLM-BERT language model layers 402 to a last layer of one of the neural network layers (404-1, 404-2, and 404-3), depending on the respective network model being trained. As described above, the pre-trained language model includes a plurality of embedding layers. Therefore, the MLM-BERT language model, which is a fine-tuned version of the pre-trained language model, also includes embedding layers, referred to as the MLM-BERT language model layers 402.

In the multi-task deep neural network fine-tuning module 306, each neural network model has a plurality of layers, a subset of layers of the plurality of layers being shared among all neural network models. This shared subset of layers is the layers of the MLM-BERT language model layers 402. Further, each neural network model has a subset of layers specific to the unique task value the neural network model is trained on. The subset of layers specific to a task is not shared among the neural network models; such subsets of layers are depicted as neural network layers 404-1, 404-2, and 404-3.

For each neural network model, a neural network loss for the neural network is computed based on the neural network model's intent prediction of a question of the data sample and the respective intent of the question. The neural network loss is backpropagated, adjusting values of learnable parameters of the respective neural network model layers 404-1, 404-2, or 404-3, and the learnable parameters of the MLM-BERT language model.

When all values of learnable parameters of neural network models are optimized, fine-tuning the MLM-BERT language is completed. The generated model is referred to as the MT-DNN-BERT language model. It will be appreciated that example embodiments can describe the sequence of generating the MLM-BERT language model and the MT-DNN-BERT language model differently. For instance, the MT-DNN-BERT language model can be generated by fine-tuning the pre-trained language model; then, the MLM-BERT language model can be generated by fine-tuning the MT-DNN-BERT. In other example embodiments, only one fine-tuning stage is performed; for instance, only the MT-DNN-BERT language model is generated by fine-tuning the pre-trained language model. In another example embodiment, only the MLM-BERT language model is generated by fine-tuning the pre-trained language model. At this stage, the operations performed in the embedding generator module 102 are described, and the MT-DNN-BERT language model is trained. The MT-DNN-BERT language model can generate embeddings when applied to data samples during training or input data during inference making. This MT-DNN-BERT language model can be included in the embedding generator module 102 and used for inference making, as described in FIG. 1.

Figure 5:
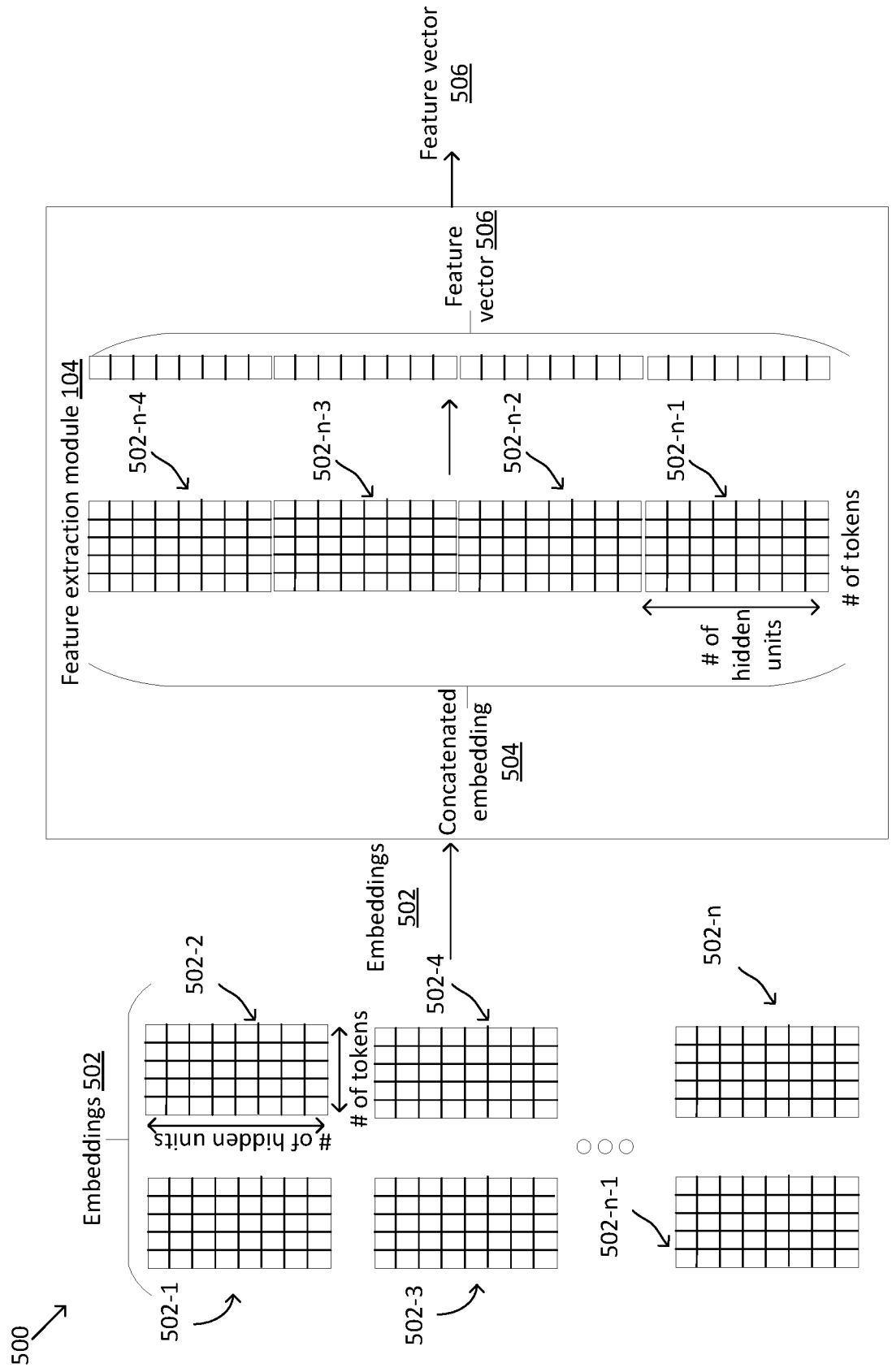
FIG. 5 is an illustrative diagram of the method performed by the feature extraction module, according to example embodiments.

FIG. 5 is an illustrative diagram of the method performed by the feature extraction module 104. FIG. 3 and FIG. 4 described how the MT-DNN-BERT language model included in the embedding generator module 102 of FIG. 1 is generated. Referring to FIG. 1, embeddings 502 generated for input data are provided to a feature extraction module 104 to extract feature vectors 506. The illustrative diagram 500 describes how a feature vector 506 is extracted from embeddings 502 generated for input data (e.g., a question). Each embedding is the output of an embedding layer (502-1, 502-2, ..., 502-$n$) of the MT-DNN_BERT language model. For instance, if example embodiments use the pre-trained language model BERT-Base Uncased (12 embedding layers, 768 hidden units) described above, then there are 12 embedding layers. Therefore, the output of the respective MT-DNN-BERT model can contain 12 embeddings. Each embedding (502-1, 502-2, ..., 502-$n$) has a plurality of token embeddings, where there is an embedding for each token of the input data. Each token embedding is a vector of size depending on the number of hidden units of the pre-trained language model. If the BERT-Base Uncased is used, then each token embedding has a length of 768 elements.

The feature extraction module 104 receives all embeddings 502. In example embodiments, the feature extraction module 104 uses the embeddings of the last four layers before the last layer (i.e. 502-$n$-1, 502-$n$-2, 502-$n$-3, and 502-$n$-4). In other words, if the pre-trained language model has 12 embedding layers, then the feature extraction module 104 uses embeddings of embedding layers 8, 9, 10, and 11. The feature extraction module 104 concatenates such embeddings to generate the concatenated embedding 504. The concatenated embedding 504 includes an embedding for each token. Each token embedding of the concatenated embedding 504 is a result of concatenating token embedding of a plurality of embeddings 502 (i.e., embeddings of 4 layers in this example). Therefore, if each token embodiment is of size 768, then each token embedding of the concatenated embedding 504 is of size 768×4=3072. The feature vector 506 is extracted from the concatenated embedding 504 by computing the average of all token embeddings of the concatenated embedding 504. For instance, if the concatenated embedding 504 is of size 3072×5, in the scenario where there are 5 token embeddings, then the feature vector 506 would be of size 3072×1. The feature vector 506 is the output of the feature extraction module 104 and is used to train an intent classifier model in the intent classifier module 106.

It is understood that using the last four layers before the last layer (i.e. 502-$n$-1, 502-$n$-2, 502-$n$-3, and 502-$n$-4) to generate the concatenated embedding 504 was just an example. Different embedding layers and number of embedding layers may be concatenated to generate the concatenated embedding 504.

Referring back to FIG. 1, the feature vector 506 is used in the intent classifier module 106. In FIG. 1, the intent classifier model is configured through training to classify feature vectors 506 into intents. Training the intent classifier model can be performed using any suitable classifier, such as any support vector machine (SVM), neural network, or any other suitable algorithm. In some embodiments, the intent classifier module 106 implements an SVM algorithm to train the intent classifier model. Training the SVM may require a labelled training dataset since SVM is a supervised machine learning algorithm.

Example embodiments include methods using the question-intent tuple dataset 210 to train the SVM. In such examples, the task value of the question-intent tuple dataset 210 may not be used, and the SVM is trained to classify the questions into intents. Example embodiments can use a dataset other than the question-intent tuple dataset 210 for training the SVM. The dataset for training the SVM may be an enterprise-specific dataset. The enterprise-specific dataset may include questions and intents specific to the industry of the enterprise developing the chatbot (e.g., finance, education, logistics, transportation, etc.). In example embodiments, the enterprise-specific dataset may be collected by the enterprise that is developing the chatbot, making the chatbot even more tailored towards the needs of the enterprise.

Figure 6:
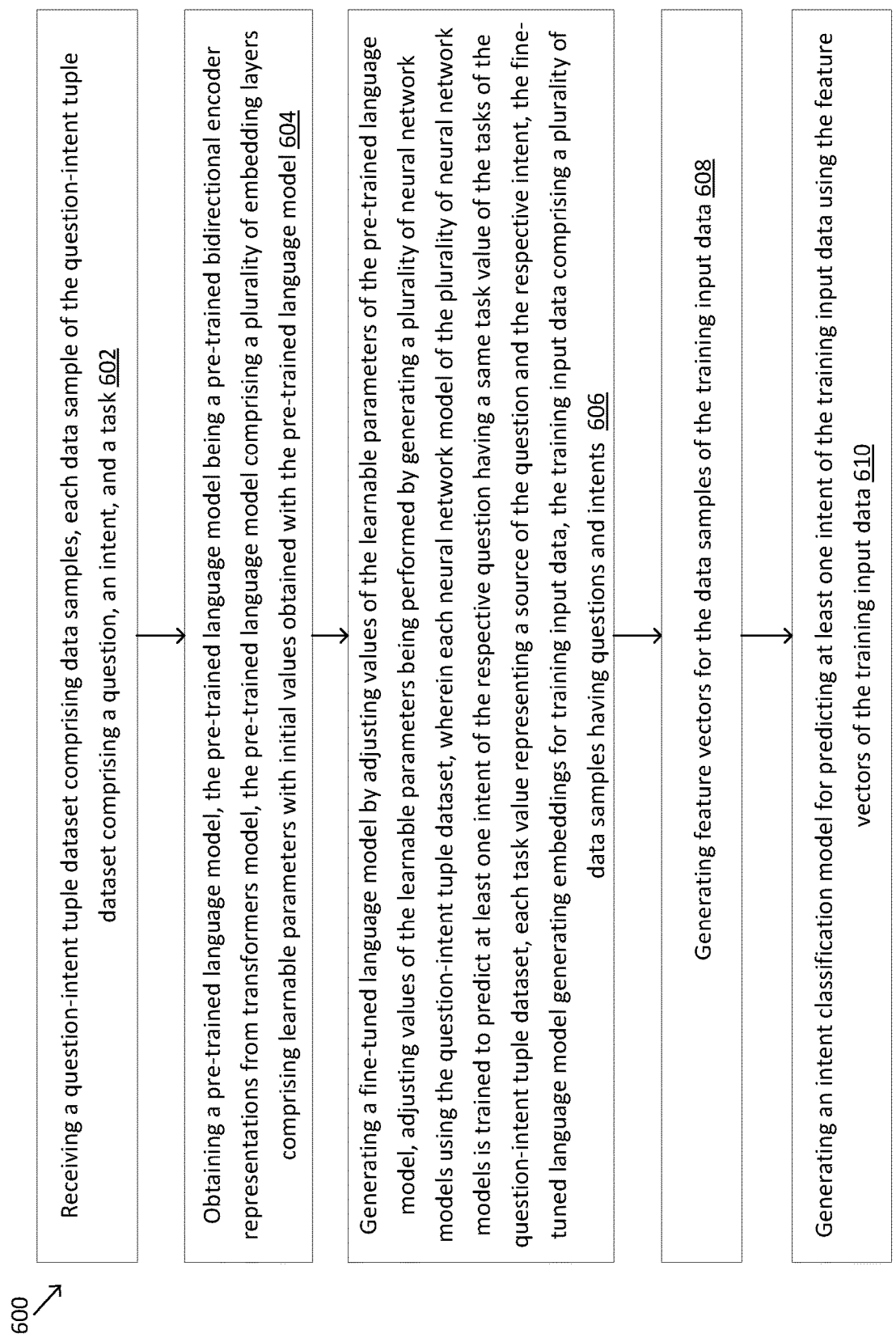
FIG. 6 is a flowchart of an example method for generating the MT-DNN-BERT language model from a pre-trained language model, according to example embodiments.

FIG. 6 is a flowchart of an example method 600 for generating an MT-DNN-BERT language model from a pre-trained language model without generating the MLM-BERT language model. The method 600 generates an MT-DNN-BERT language model from a pre-trained language model by fine-tuning the pre-trained language model instead of fine-tuning the MLM-BERT language model.

The method 600 starts at step 602 where the multi-task deep neural network fine-tuning module 306 receives a question-intent tuple dataset 210 comprising data samples. As described before, each data sample of the question-intent tuple dataset 210 includes a question, an intent, and a task. The method 600 then proceeds to step 604.

At step 604, the multi-task deep neural network fine-tuning module 306 obtains a pre-trained language model from the pre-trained language module 302. The pre-trained language model is a pre-trained bidirectional encoder representations from transformers model comprising a plurality of embedding layers. When inputting data samples to the pre-trained language model, the method 600, through the multi-task deep neural network fine-tuning module 306, generates embeddings for each data sample. The method 600 then proceeds to step 606.

At step 606, the multi-task deep neural network fine-tuning module 306 generates a fine-tuned language model, which is the MT-DNN-BERT language model in this example embodiment. The MT-DNN-BERT language model is generated by adjusting values of learnable parameters (fine-tuning) of the pre-trained language model. This fine-tuning is performed by generating a plurality of neural network models using the question-intent tuple dataset 210. The number of neural network models can be the number of unique task values. Then, each neural network model of the plurality of neural network models is trained to predict intents of questions having a unique task value. In other words, each neural network model is trained to predict the intents of the questions having a same task value. Once the multi-task deep neural network fine-tuning module 306 has generated the fine-tuned language model, the method proceeds to step 608.

At step 608, the method 600 starts the stages of training the intent classifier model, which starts by extracting features. The method 600 can use any dataset comprising questions and intents to train the intent classifier model. Such dataset can be referred to as training input data. The extraction module 104 generates a feature vector for every data sample of the training input data. The method 600 then proceeds to step 610. At step 610, the intent classifier module 106 uses the feature vectors of the data samples of the training input data and generates an intent classification model for predicting the intents of the training input data.

The intent classification model, generated at step 610, can be used for inference making in chatbots to classify the questions asked by users into intents. Further, the chatbots can use the intents to answer the user's questions or connect the user to a person who can answer the user.

Figure 7:
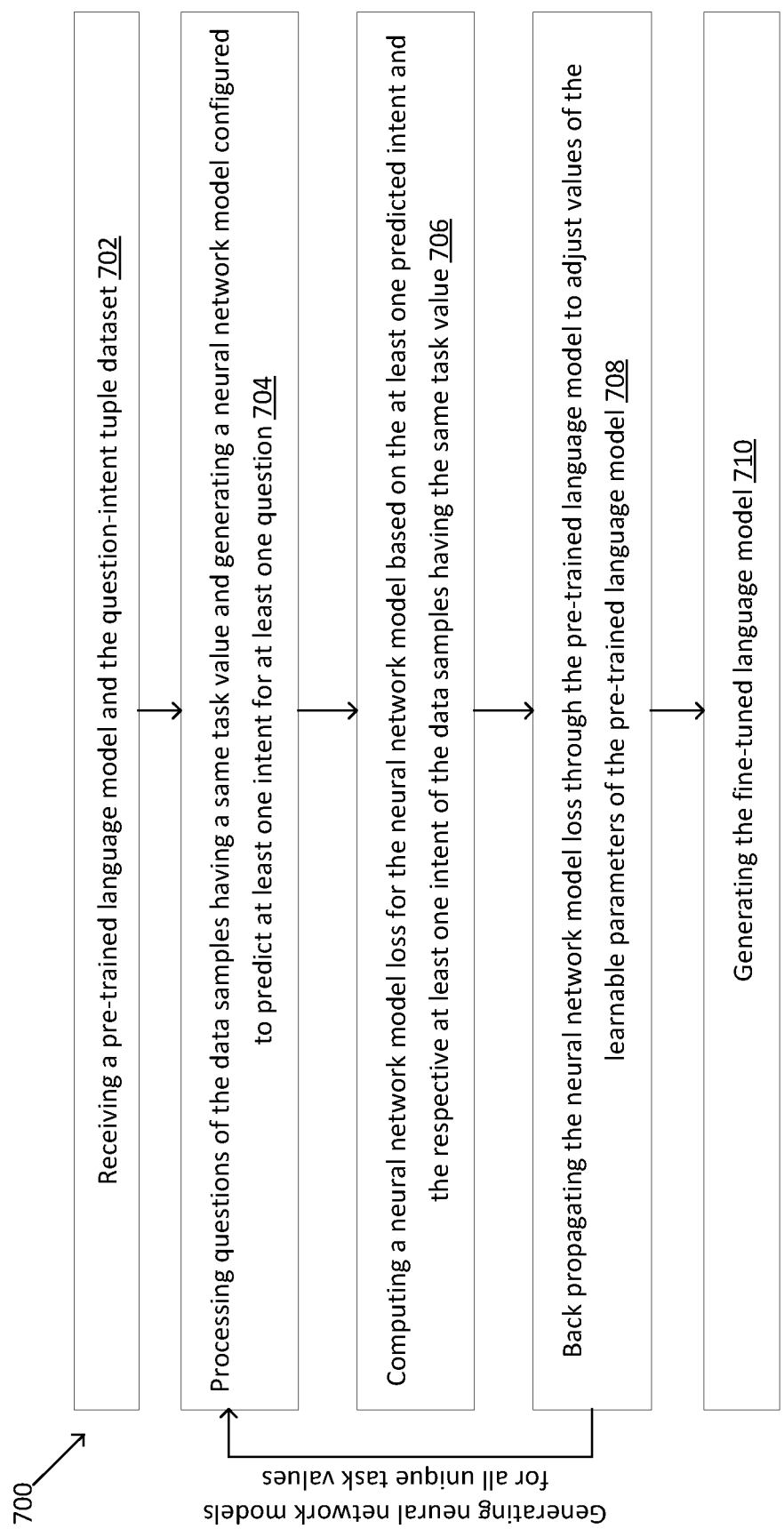
FIG. 7 is a flowchart of an example method for training a plurality of neural network models used in generating the MT-DNN-BERT language model described FIG. 6, according to example embodiments.

FIG. 7 is a flowchart of an example method 700 for training a plurality of neural network models used in generating the MT-DNN-BERT language model described in FIG. 6. Method 600 in FIG. 6 described the method for generating the MT-DNN-BERT language model and explained, without going into detail, that generating the MT-DNN-BERT language model includes training a plurality of neural network models. Method 700 describes in detail the part of method 600 with respect to training the plurality of neural network models. The plurality of neural network models collectively referred to as the multi-task deep neural network model as described above.

The method 700 starts at step 702 where the multi-task deep neural network fine-tuning module 306 receives a pre-trained language model and the question-intent tuple dataset 210.

At step 704, the multi-task deep neural network fine-tuning module 306 processes questions of the data samples of a same task value and generates a neural network model configured to classify questions into intents for data samples of the same task value.

Each neural network model comprises a plurality of layers. A first subset of layers of the plurality of layers is shared among all neural network models. However, a second subset of layers of the plurality of layers is specific to the neural network model for the same task value being processed. The first subset of layers and the second subset of layers are disjoint.

The method 700 inputs the quested of the data samples of the question-intent tuple dataset 210 of the same task value into the neural network model to forward propagate the questions of the data samples with the same task value and generate the predicted intent for each question. The method 700 then proceeds to step 706.

At step 706, the multi-task deep neural network fine-tuning module 306 computes a neural network model loss for the neural network model based on the predicted intents and the respective intents of the data samples with the same task value. Once the neural network model loss is computed, the method 700 proceeds to step 708.

At step 708, the multi-task deep neural network fine-tuning module 306 back propagates the neural network language model loss through the pre-trained language model to adjust values of learnable parameters of the pre-trained language model. Steps 706-708 are repeated until the values of the learnable parameters of the pre-trained language model are optimized. The method 700 continues until the neural network models are generated for all unique task values.

At step 710, after the multi-task deep neural network fine-tuning module 306 generates neural network models for all unique task values, the pre-trained language model whose values of learnable parameters were continuously adjusted and optimized becomes the fine-tuned language model, which in this example is the MT-DNN-BERT language model. In other words, at step 710, the multi-task deep neural network fine-tuning module 306 generates the MT-DNN-BERT language model.

The generated MT-DNN-BERT language model at step 710 is used to generate embeddings. This MT-DNN-BERT language model can be incorporated with any subsequent machine learning algorithms to train a model for classifying questions into intents. It can also be used in chatbots during inference making for extracting embeddings of input data.

Figure 8:
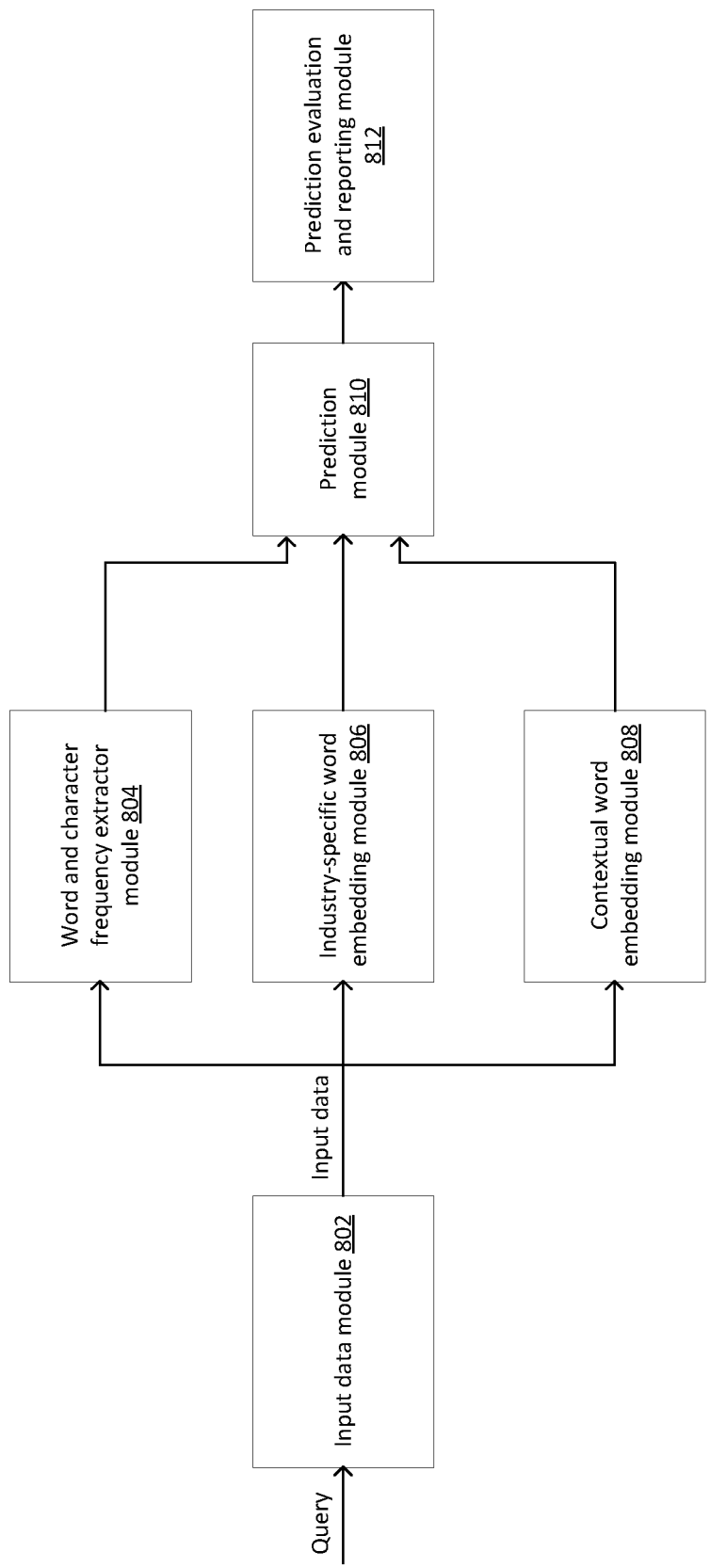
FIG. 8 is an example chatbot system implementing modules of the intent classification system of FIG. 1, according to example embodiments.

FIG. 8 is an example chatbot system 800 implementing modules of the intent classification system 100 of FIG. 1. The chatbot system 800 receives a query from a user through the input data module 802, which may implement a graphical user interface. The input data module 802 outputs input data, which is the query in text format. The query may be a text typed directly into the graphical user interface of the input data module 802, or a spoken query, which is converted to text through a speech-to-text converter (not shown). The input data may be in the language the chatbot system 800 is trained with, or the input data may also be in a different language but translated through a translation module (not shown) into the language of the chatbot system 800. The input data may include a plurality of words representing the user question in the query, for example, "Has my package been shipped yet?", "When will my package arrive", etc.

The input data 802 may not be processed directly by subsequent modules of the chatbot system 800 as words but may be converted to numerical representation in numerical representation modules, including word and character frequency extractor module 804, industry-specific word embedding module 806, and contextual word embedding module 808. Example embodiments of chatbot systems 800 may not need to have all the mentioned numerical representation modules (804, 806, and 808).

The character frequency extractor module 804 receives the input data and may represent how frequently each word in the input data and each n-character sequence appear in the chatbot system's 800 training datasets. No word analysis with respect to the relationships between words can be performed in the character frequency extractor module 804. Further, the character frequency extractor module 804 can provide the prediction module 812, responsible for generating answers, with information to improve the accuracy of answers. The output of the character frequency extractor module 804 differs between chatbots as it is mainly influenced by the training datasets used by the enterprise implementing the chatbot system 800.

The industry-specific word embedding module 806 receives the input data and generates embeddings for the input data. The embeddings generated by the industry-specific word embedding module 806 are influenced by the industry of the enterprise implementing the chatbot system 800. For instance, a word's embeddings of a telecommunications industry would have different embeddings than those in the finance or transportation industries.

The contextual word embedding module 808 also receives input data and generates embeddings for the input data, but such embeddings capture the contextual meaning of words in the input data. Unlike industry-specific word embedding module 806, the contextual word embedding module 808 dynamically adjusts the word embeddings based on other words in the input data. The contextual word embedding module 808 enables the prediction module 812 to better understand the specific meaning of a word in the input data. For example, the meaning of the word "park" varies between "where can I park my car?" and "where is the closest national park."

The prediction module 810 can receive input from the word and character frequency extractor module 804, the industry-specific word embedding module 806, and the contextual word embedding module 808, and predicts answers. The prediction module 810 can include a plurality of modules, including the feature extraction module 104 and the intent classifier module 106 of the intent classification system 100 described above. The predicted answers of the chatbot system 800 differ from one chatbot system 800 to another, depending on the enterprise's industry implementing the chatbot system 800, particularly the training datasets used in training models of the chatbot system 800. The prediction module 810 also outputs confidence values for each predicted answer indicating correctness likelihood.

The predicted answers are provided to the prediction evaluation and reporting module 812, which determines which predicted answer of the predicted answers to provide to the user, if any. Example embodiments may describe the prediction evaluation and reporting module 812 to include a plurality of confidence thresholds to compare with each predicted answer's confidence value. The confidence values are compared to a first threshold. If any confidence values are greater than the first threshold, the respective predicted answer with the highest confidence value is reported to the user. However, if none of the confidence values is greater than the first threshold, the prediction evaluation and reporting module 812 compares the confidence values to a second threshold. If any questions are greater than the second threshold, the prediction evaluation and reporting module 812 requests clarifications from the user. The clarification request may be reported to the user along with at least one of the predicted answers with a confidence value above the second threshold. If none of the confidence values is above the second threshold, the prediction evaluation and reporting module 812 reports to the user that the question in the query was not understood.

In the example embodiments, it should be understood that the intent classification system 100, intent classification hardware 200, embedding generator module 102 may be implemented in other manners. For example, the described embedding generator module 102 is an example embodiment. For example, other types of datasets can be received, and masked language modelling fine-tuning module 304 may receive input from the multi-task deep neural network fine-tuning module 306. Further, a plurality of units or components may be combined or integrated into another system, or some features may be ignored or not performed; for example, the masked language modelling fine-tuning module 304 may not exist and its corresponding MLM-BERT language model may not be generated. In such example, the multi-task deep neural network fine-tuning module may perform the tasks of obtaining the pre-trained language model.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of example embodiments may be implemented in a form of a software product. The software product is stored in a storage medium, and includes several instructions for instructing a computer device (which may be a personal computer, a server, or a network device) to perform all or some of the steps of the methods described in the example embodiments. The foregoing storage medium includes any medium that can store program code, such as a Universal Serial Bus (USB) flash drive, a removable hard disk, a read-only memory (Read-Only Memory, ROM), a random access memory (Random Access Memory, RAM), a magnetic disk, or an optical disc.

In the described methods or block diagrams, the boxes may represent events, steps, functions, processes, modules, messages, and/or state-based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps described herein may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The described embodiments are considered to be illustrative and not restrictive. Example embodiments described as methods would similarly apply to systems or devices, and vice-versa.

The various example embodiments are merely examples and are in no way meant to limit the scope of example embodiments. Variations of the innovations described herein will be apparent to persons of ordinary skill in the art, such variations being within the intended scope of example embodiments. In particular, features from one or more of the example embodiments may be selected to create alternative embodiments comprises of a sub-combination of features which may not be explicitly described. In addition, features from one or more of the described example embodiments may be selected and combined to create alternative example embodiments comprised of a combination of features which may not be explicitly described. Features suitable for such combinations and sub-combinations would be readily apparent to persons skilled in the art upon. The subject matter described herein intends to cover all suitable changes in technology.

What is claimed is:

1. A method for training an intent classification system, comprising:
    receiving a question-intent tuple dataset comprising data samples, each data sample of the question-intent tuple dataset having:
        a question,
        an intent; and
        a task;
    obtaining a pre-trained language model, the pre-trained language model being a pre-trained bidirectional encoder representations from transformers model, the pre-trained language model comprising a plurality of embedding layers comprising learnable parameters with values obtained with the pre-trained language model;
    generating a fine-tuned language model by adjusting values of the learnable parameters of the pre-trained language model, adjusting values of the learnable parameters being performed by generating a plurality of neural network models using the question-intent tuple dataset, wherein each neural network model of the plurality of neural network models is trained to predict at least one intent of a respective question having a same task value of the tasks of the question-intent tuple dataset, each task value representing a source of the question and a respective intent, the fine-tuned language model generating embeddings for training input data, the training input data comprising a plurality of data samples having questions and intents;
    generating feature vectors for the data samples of the training input data; and
    generating an intent classification model for predicting at least one intent of the training input data using the feature vectors of the training input data.

2. The method of claim 1, wherein generating the plurality of neural network models comprises:
    for data samples of the question-intent tuple dataset having the same task value, generating a neural network model configured to predict at least one intent for at least one question of the data sample of the question-intent tuple dataset, generating the neural network model comprising:
        inputting the questions of the data samples of the question-intent tuple dataset having the same task value into the neural network model to forward propagate the questions of the data samples of the question-intent tuple dataset having the same task value and generate the at least one predicted intent for each question of the question-intent tuple dataset having the same task value;
        computing a neural network model loss for the neural network model based on the at least one predicted intent and a respective at least one intent of the data samples of the question-intent tuple dataset having the same task value; and
        back propagating the neural network model loss through the pre-trained language model to adjust values of the learnable parameters of the pre-trained language model; and
    in response to generating the neural network models for all unique task values, the pre-trained language model becoming the fine-tuned language model.

3. The method of claim 1, further comprising fine-tuning values of the learnable parameters of the pre-trained language model by:
    receiving a conversation dataset comprising data samples, each data sample of the conversation dataset having words;
    tokenizing each data sample of the conversation dataset to generate a tokenized data sample comprising tokens;
    masking at least one token of the tokenized data sample of the conversation dataset to generate a tokenized data sample with masked tokens;
    generating, using the pre-trained language model, a predicted token for the at least one masked token;
    computing a masked language model loss for the pre-trained language model based on the predicted token and a respective token of the data sample of the conversation dataset; and
    back propagating the masked language model loss through the pre-trained language model to adjust values of learnable parameters of the pre-trained language model.

4. The method of claim 3, wherein the tokenizing each data sample of the conversation dataset comprises separating each data sample into tokens, each token being represented with a unique identifier.

5. The method of claim 1, wherein each neural network model comprises a plurality of layers, a first subset of layers of the plurality of layers being shared among all neural network models and a second subset of layers of the plurality of layers being specific to each neural network model, the first subset of layers and the second subset of layers being disjoint.

6. The method of claim 5, wherein the first subset of layers is the pre-trained language model.

7. The method of claim 5, wherein input to the second subset of layers of each neural network model is output of a last embedding layer of the pre-trained language model.

8. The method of claim 1, wherein the intent classification model is generated by a support vector machine (SVM) classifier.

9. The method of claim 1, wherein the training input data is the question-intent tuple dataset.

10. The method of claim 1, wherein the training input data is an enterprise-specific dataset comprises a question and an intent.

11. The method of claim 1, wherein the fine-tuned language model comprises a plurality of embedding layers, the feature vector for each data sample of the enterprise-specific dataset being generated by:
    inputting the questions of the data samples of the enterprise-specific dataset into the fine-tuned language model;
    obtaining, for each data sample of the enterprise-specific dataset, embeddings from a subset of the plurality of embedding layers of the fine-tuned language model, each embedding comprising token embeddings with an embedding for each token;
    generating a concatenated embedding by concatenating the embeddings from the subset of the plurality of embedding layers; and
    generating the feature vector by computing an average of the token embeddings.

12. The method of claim 1, wherein the method is performed by at least one processor.

13. The method of claim 1, wherein the source of the task value is an industry where the questions and intents of the task value are collected from.

14. An intent classification computer program product by an intent classifier training process, the computer program product comprising instructions stored in a non-transitory computer-readable medium which, when executed by at least one processor, causes the at least one processor to perform intent classification, the intent classifier training process comprising:
    receiving a question-intent tuple dataset comprising data samples, each data sample of the question-intent tuple dataset having:
        a question,
        an intent; and
        a task;
    obtaining a pre-trained language model, the pre-trained language model being a pre-trained bidirectional encoder representations from transformers model, the pre-trained language model comprising a plurality of embedding layers comprising learnable parameters with values obtained with the pre-trained language model;
    generating a fine-tuned language model by adjusting values of the learnable parameters of the pre-trained language model, adjusting values of the learnable parameters being performed by generating a plurality of neural network models using the question-intent tuple dataset, wherein each neural network model of the plurality of neural network models is trained to predict at least one intent of a respective question having a same task value of the tasks of the question-intent tuple dataset, each task value representing a source of the question and a respective intent, the fine-tuned language model generating embeddings for training input data, the training input data comprising a plurality of data samples having questions and intents;
    generating feature vectors for the data samples of the training input data; and
    generating an intent classification model for predicting at least one intent of the training input data using the feature vectors of the training input data.

15. The computer program product of claim 14, wherein generating the plurality of neural network models comprises:
    for data samples of the question-intent tuple dataset having the same task value, generating a neural network model configured to predict at least one intent for at least one question of the data sample of the question-intent tuple dataset, generating the neural network model comprising:
        inputting the questions of the data samples of the question-intent tuple dataset having the same task value into the neural network model to forward propagate the questions of the data samples of the question-intent tuple dataset having the same task value and generate the at least one predicted intent for each question of the question-intent tuple dataset having the same task value;
        computing a neural network model loss for the neural network model based on the at least one predicted intent and a respective at least one intent of the data samples of the question-intent tuple dataset having the same task value; and
        back propagating the neural network model loss through the pre-trained language model to adjust values of the learnable parameters of the pre-trained language model; and
    in response to generating the neural network models for all unique task values, the pre-trained language model becoming the fine-tuned language model.

16. The computer program product of claim 14, further comprising fine-tuning values of the learnable parameters of the pre-trained language model by:
    receiving a conversation dataset comprising data samples, each data sample of the conversation dataset having words;
    tokenizing each data sample of the conversation dataset to generate a tokenized data sample comprising tokens;
    masking at least one token of the tokenized data sample of the conversation dataset to generate a tokenized data sample with masked tokens;
    generating, using the pre-trained language model, a predicted token for the at least one masked token;
    computing a masked language model loss for the pre-trained language model based on the predicted token and a respective token of the data sample of the conversation dataset; and
    back propagating the masked language model loss through the pre-trained language model to adjust values of learnable parameters of the pre-trained language model.

17. The computer program product of claim 14, wherein each neural network model comprises a plurality of layers, a first subset of layers of the plurality of layers being shared among all neural network models and a second subset of layers of the plurality of layers being specific to each neural network model, the first subset of layers and the second subset of layers being disjoint.

18. The computer program product of claim 17, wherein the first subset of layers is the pre-trained language model.

19. The computer program product of claim 14, wherein the intent classification model is generated by a support vector machine (SVM) classifier.

20. The computer program product of claim 14, wherein the source of the task value is an industry where the questions and intents of the task value are collected from.

21. A system for training an intent classifier comprising:
a memory; and
a processing device in communication with the memory, the processing device configured to execute instructions to cause the computing system to:
receive a question-intent tuple dataset comprising data samples, each data sample of the question-intent tuple dataset having:
a question,
an intent; and
a task;
obtain a pre-trained language model, the pre-trained language model being a pre-trained bidirectional encoder representations from transformers model, the pre-trained language model comprising a plurality of embedding layers comprising learnable parameters with values obtained with the pre-trained language model;
generate a fine-tuned language model by adjusting values of the learnable parameters of the pre-trained language model, adjusting values of the learnable parameters being performed by generating a plurality of neural network models using the question-intent tuple dataset, wherein each neural network model of the plurality of neural network models is trained to predict at least one intent of a respective question having a same task value of the tasks of the question-intent tuple dataset, each task value representing a source of the question and a respective intent, the fine-tuned language model generating embeddings for training input data, the training input data comprising a plurality of data samples having questions and intents;
generate feature vectors for the data samples of the training input data; and
generate an intent classification model for predicting at least one intent of the training input data using the feature vectors of the training input data.

22. The system of claim 21, wherein generating the plurality of neural network models comprises:
for data samples of the question-intent tuple dataset having the same task value, generating a neural network model configured to predict at least one intent for at least one question of the data sample of the question-intent tuple dataset, generating the neural network model comprising:
inputting the questions of the data samples of the question-intent tuple dataset having the same task value into the neural network model to forward propagate the questions of the data samples of the question-intent tuple dataset having the same task value and generate the at least one predicted intent for each question of the question-intent tuple dataset having the same task value;
computing a neural network model loss for the neural network model based on the at least one predicted intent and a respective at least one intent of the data samples of the question-intent tuple dataset having the same task value; and
back propagating the neural network model loss through the pre-trained language model to adjust values of the learnable parameters of the pre-trained language model; and
in response to generating the neural network models for all unique task values, the pre-trained language model becoming the fine-tuned language model.

23. The system of claim 21, wherein the instructions further cause the computing system to fine-tune values of the learnable parameters of the pre-trained language model by:
receiving a conversation dataset comprising data samples, each data sample of the conversation dataset having words;
tokenizing each data sample of the conversation dataset to generate a tokenized data sample comprising tokens;
masking at least one token of the tokenized data sample of the conversation dataset to generate a tokenized data sample with masked tokens;
generating, using the pre-trained language model, a predicted token for the at least one masked token;
computing a masked language model loss for the pre-trained language model based on the predicted token and a respective token of the data sample of the conversation dataset; and
back propagating the masked language model loss through the pre-trained language model to adjust values of learnable parameters of the pre-trained language model.

24. The system of claim 21, wherein each neural network model comprises a plurality of layers, a first subset of layers of the plurality of layers being shared among all neural network models and a second subset of layers of the plurality of layers being specific to each neural network model, the first subset of layers and the second subset of layers being disjoint.

25. The system of claim 24, wherein the first subset of layers is the pre-trained language model.

26. The system of claim 21, wherein the intent classification model is generated by a support vector machine (SVM) classifier.

27. The system of claim 21, wherein the source of the task value is an industry where the questions and intents of the task value are collected from.

28. A non-transitory computer-readable medium storing instructions which, when executed by at least one processor cause the at least one processor to:
receive a question-intent tuple dataset comprising data samples, each data sample of the question-intent tuple dataset having:
a question,
an intent; and
a task;
obtain a pre-trained language model, the pre-trained language model being a pre-trained bidirectional encoder representations from transformers model, the pre-trained language model comprising a plurality of embedding layers comprising learnable parameters with values obtained with the pre-trained language model;
generate a fine-tuned language model by adjusting values of the learnable parameters of the pre-trained language model, adjusting values of the learnable parameters being performed by generating a plurality of neural network models using the question-intent tuple dataset, wherein each neural network model of the plurality of neural network models is trained to predict at least one intent of a respective question having a same task value of the tasks of the question-intent tuple dataset, each task value representing a source of the question and a respective intent, the fine-tuned language model generating embeddings for training input data, the training input data comprising a plurality of data samples having question and intents;

generate feature vectors for the data samples of the training input data; and generate an intent classification model for predicting at least one intent of the training input data using the feature vectors of the training input data.

29. The non-transitory computer-readable medium of claim 28, wherein generating the plurality of neural network models comprises:

for data samples of the question-intent tuple dataset having the same task value, generating a neural network model configured to predict at least one intent for at least one question of the data sample of the question-intent tuple dataset, generating the neural network model comprising:

inputting the questions of the data samples of the question-intent tuple dataset having the same task value into the neural network model to forward propagate the questions of the data samples of the question-intent tuple dataset having the same task value and generate the at least one predicted intent for each question of the question-intent tuple dataset having the same task value;

computing a neural network model loss for the neural network model based on the at least one predicted intent and a respective at least one intent of the data samples of the question-intent tuple dataset having the same task value; and back propagating the neural network model loss through the pre-trained language model to adjust values of the learnable parameters of the pre-trained language model; and in response to generating the neural network models for all unique task values, the pre-trained language model becoming the fine-tuned language model.

30. The non-transitory computer-readable medium of claim 28, wherein the source of the task value is an industry where the questions and intents of the task value are collected from.

* * * * *